UNITED STATES PATENT OFFICE.

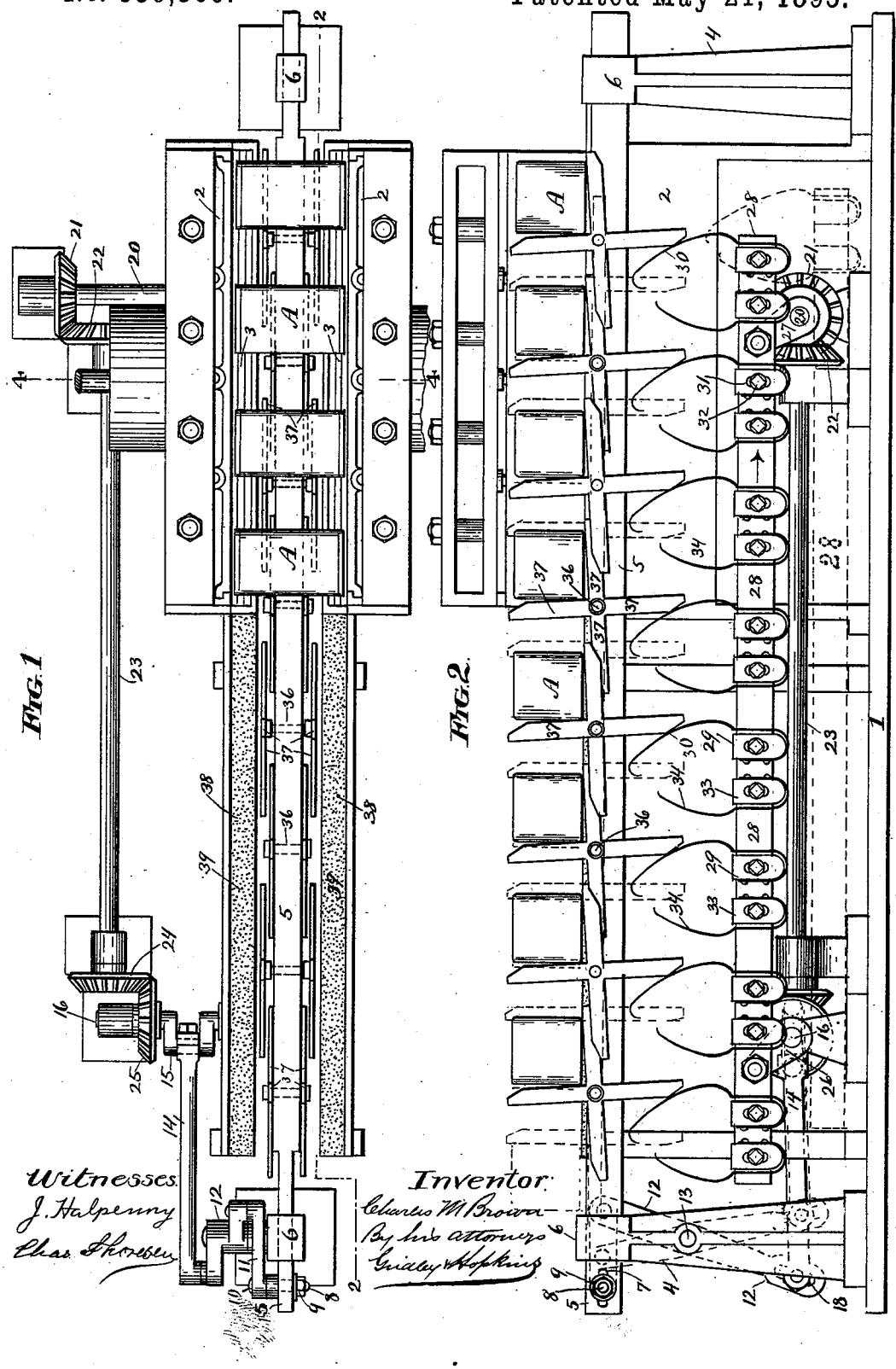

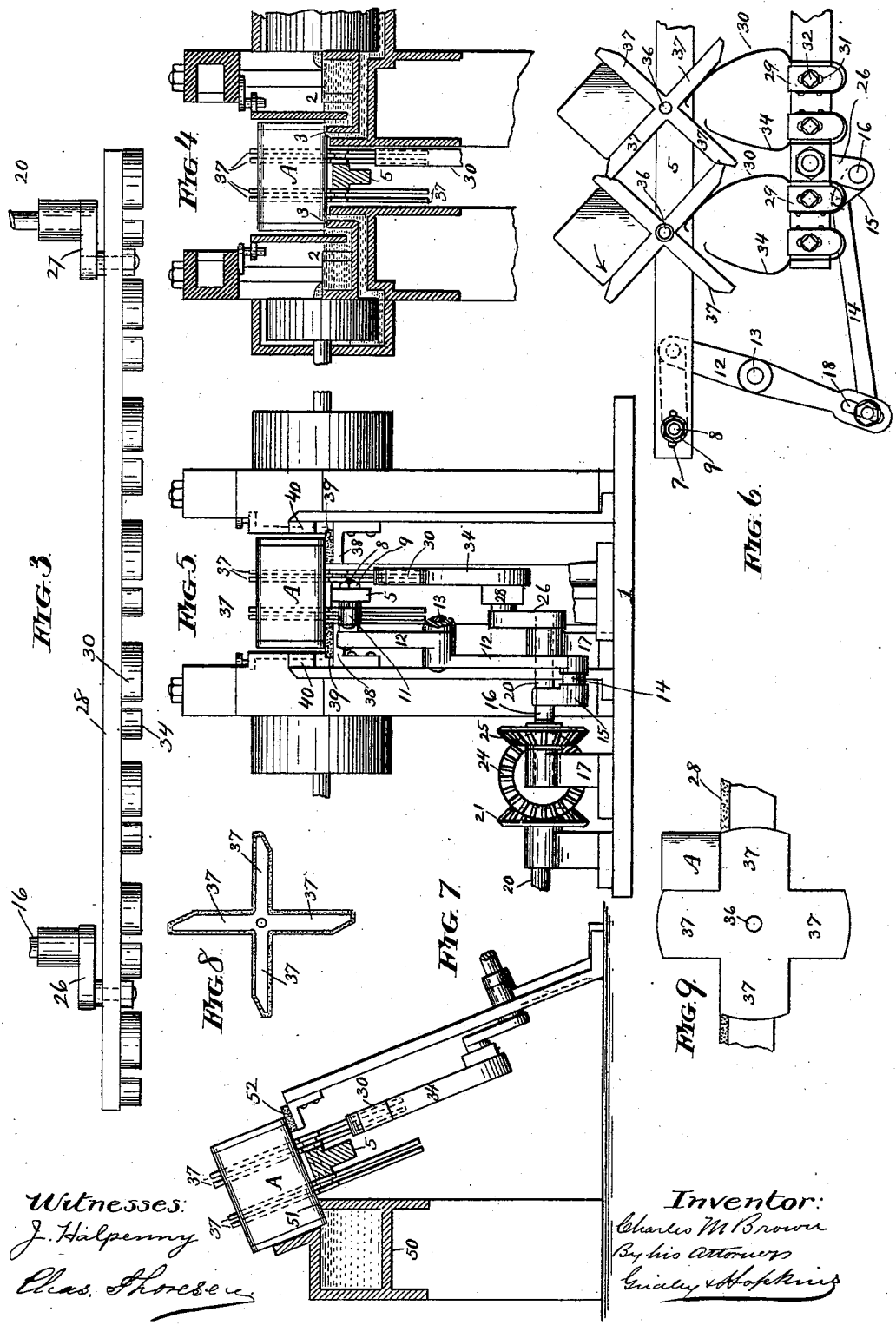

CHARLES M. BROWN, OF CHICAGO, ILLINOIS.

SOLDERING-MACHINE.

SPECIFICATION forming part of Letters Patent No. 539,569, dated May 21, 1895.

Application filed April 30, 1894. Serial No. 509,462. (No model.)

*To all whom it may concern:*

Be it known that I, CHARLES M. BROWN, a citizen of the United States, residing at Chicago, in the county of Cook and State of Illinois, have invented certain new and useful Improvements in Soldering-Machines, of which the following is a specification, reference being had to the accompanying drawings, which are made a part hereof, and in which—

Figure 1 is a plan view of a portion of a soldering-machine embodying the invention in its preferred form. Fig. 2 is a vertical longitudinal section thereof on the line 2 2, Fig. 1. Fig. 3 is a plan view of some of the parts that are hereinafter fully described. Fig. 4 is a vertical transverse section of the machine on the line 4 4, Fig. 1. Fig. 5 is an end elevation thereof. Fig. 6 is a side elevation of a portion of the mechanism for turning the article that is being operated upon. Fig. 7 is a view partly in end elevation and partly in vertical transverse section of a soldering-machine embodying some features of the invention. Figs. 8 and 9 are elevations of one of the "forks" under two modifications.

The present invention relates more particularly to machines for soldering the seams of cans and other articles of polygonal shape. In soldering the end seams of articles of polygonal shape, where the soldering is done by bringing first one and then another side of the article into contact with the molten solder, it is of course necessary to turn the article over and over during the process until all of its sides have been acted upon. This turning of the article is sometimes done by hand and sometimes by machinery. All machines for this purpose with which I am familiar are open to the objection that the article is jarred, and the solder which has been taken up by the seam is thereby disturbed. If the article is jarred while the solder is still in a fluid state, or is just at the point of freezing, there is great liability that the seam will have one or more holes, and where the article happens to be a can for preserving purposes, one of these holes, however small, will admit sufficient air to eventually spoil the contents of the can. However perfect a can soldering machine may be in other respects, if its action is such that it produces even a small percentage (say five per cent.) of these "leakers," it is absolutely worthless, because the product of such a machine is not salable if the defect is known. Where the can is manipulated by hand, the workman may, by the exercise of a little care and skill, avoid jarring it, and consequently avoid, in the finished article, all defects resulting from this cause. The only objection to this manual process is that it is expensive, since the capacity of any one workman is necessarily limited, and as an incident to this the working expenses of the factory are materially increased.

The object of the present invention is to provide a practical machine which will result in the saving that is usually incident to the substitution of machine work for hand work, and which will at the same time give a product as perfect as can be produced by hand work. In accomplishing this object I have provided a machine whose movements are cushioned as much as possible, and I have provided such parts of the machine as are adapted to have contact with the article being operated upon (and especially the supports) with a covering of some soft material, such, for example, as cloth, felt, or any other substance that may be thought preferable.

Another object of the invention is to provide improved mechanism for turning the article from one side to another, for the purpose of bringing its several sides successively into position to be operated upon.

Other objects of the invention will appear in the descriptive portion of the specification.

To these ends the invention consists in the features of novelty that are particularly pointed out in the claims hereinafter.

In the drawings 1 represents a suitable base plate, to which are secured the several standards for supporting the various parts of the machine.

The machine shown in Figs. 1, 2, 4 and 5 is adapted to simultaneously solder the seams at opposite ends of a can of rectangular shape. It has two solder pans, 2, which are constructed, arranged and provided with accessories as shown and described in another application, which was filed by me on the 27th day of December, 1893, Serial No. 494,678. For the purposes of this application it is not necessary to describe these parts in detail, but it is sufficient to say that the pans are so located with relation to each other that the seams at opposite ends of the can may be simultaneously brought into contact with exposed portions of the solder bath, the seam at one end being brought into contact with the solder in one of the pans, and the seam at the other end being brought into contact with the solder in the other pan. Each of the pans is provided with a part 3, one office of which is to support the can while being soldered, and each of them is also provided with some suitable means for maintaining the surface of the exposed portion of the solder at a level above the level of the support.

Preferably, a machine which embodies all of the several features of the present invention has a solder bath having these two oppositely located exposed portions to which the seams at opposite ends of the can may be simultaneously presented, but I desire to have it understood that so far as the generic feature of the invention is concerned, it is not necessarily limited to a machine of this character. On the contrary, many features of the invention may be embodied in a machine which is adapted to operate upon only one end of the can, such a machine being shown in Fig. 7, and fully described hereinafter.

Rising from the base plate 1 are standards 4, supporting a horizontal bar 5, which is located between the solder pans 2 and extends the whole length of said pans, and as much farther as may be deemed necessary. This bar is mounted loosely in bearings 6 at the upper ends of the standards, so as to be capable of an endwise, reciprocating movement. Preferably, it is of T-shape in cross-section, but, of course, this form of bar is not essential to the operation of the machine, and is adopted simply because of the advantages of strength and lightness which are incident to a bar of this particular cross-sectional shape. At one of its ends it is provided with a longitudinal slot 7, in which fits a bolt 8, made adjustable by a lock nut 9, and provided with a wrist 10, upon which fits an eye formed at one end of a link 11, the other end of which is provided with an eye for receiving a wrist carried at the upper end of a lever 12 which is fulcrumed at 13 to the standard 4, and has its lower end adjustably connected to one end of a pitman 14, the other end of which embraces a crank 15 upon a shaft 16, journaled in standards 17 rising from the base plate. The connection between the lever 12 and the pitman 14 is made adjustable by providing the lever with a longitudinal slot 18, and providing the wrist upon which the eye of the pitman fits with a lock nut and with such other features that it may be locked to the lever in the desired position. It will be seen that the rotation of the crank shaft 16, operating through the connections already described, will produce a reciprocating movement in the bar 5, and that the extent of this movement may be varied by changing the point of attachment between the lever 12 and the pitman 14. The connection between the lever 12 and the bar 5 is made adjustable for the purpose of being able to set the bar in the desired initial position. The shaft 16 derives its motion from the main driving shaft 20 through the medium of intermeshing gears 21, 22, a shaft 23 to which the gear 22 is secured, and intermeshing gears 24, 25, the former of which is secured to the shaft 23, and the latter to the shaft 16. The shafts 16 and 20 are provided with similarly constructed and similarly located cranks 26, 27, respectively, to which is loosely connected a bar 28, the arrangement being such that the bar will partake of the circular movement of the cranks and will at the same time be maintained at all times in about horizontal position. To this bar are adjustably secured a number of blocks 29, to each of which is secured a plate spring 30, the spring being so constructed and secured to the block as to give it a maximum degree of flexibility—that is to say, one end of the spring is secured to one side of the block, whence it extends downward beneath the block, thence upward by the side of the block and above it to the desired height, a space being left between the side of the block and the upward extending portion of the spring. The adjustability of the block is secured by providing it with a vertical slot 31, through which passes a bolt 32 by which it is secured to the bar. To the bar are also secured a number of blocks 33, carrying springs 34, the construction and arrangement being similar to that already described with relation to the blocks 29 and springs 30.

At suitable intervals the bar 5 is provided with a number of devices hereinafter called "turners," for turning the articles over. As shown in the drawings, each of said turners consists of a shaft 36, extending through a horizontal perforation of the bar 5 and a number of arms 37. As shown in the drawings, four arms radiate from each shaft upon each side of the bar, and these eight arms, each operating in conjunction with the one next to it, form four forks whose prongs project at right angles to each other and are adapted to receive between them the article to be operated upon, as more fully described hereinafter. The shafts constitute the fulcrums upon which the turners are adapted to turn, and in order that the arms 37 upon opposite sides of the bar may be maintained in the same radial planes, they are rigidly secured to the shafts. The distances between the adjacent shafts 36 and the length of the arms are such that the arms of one turner project beyond the arms of the next turner, and in order to avoid their coming in contact, the arms of adjacent turners upon the same side of the bar are located in different vertical planes. All of the arms upon one side of the bar 5 are, however, located in the path traveled by the springs 30 and 34, for the purpose that will appear presently.

Located upon opposite sides of the bar 5, and outside of the arms 37, are supports or ways 38, which, in fact, form continuations of the supports 3 of the solder pans, and continue from said pans for any desired distance. The top side of these supports is provided with a covering 39 of cloth, felt, or some other suitable material, for a purpose that will appear presently. As shown in Fig. 5, guide rails 40 are located outside of the supports 38, for preventing the can from falling off at the side.

If desired, the working surface of the arms 37 may also be provided with a covering of the same material, as indicated in Fig. 8.

The operation of the machine is as follows: In Figs. 1 and 2 the parts are shown in the positions that they occupy at the instant the bar 5 has completed its movement from the position indicated by dotted lines to the position shown by full lines. Just an instant before the parts reach the positions shown by full lines, a can (shown at A) is placed upon the supports 3 of the solder pans, either in contact with or very close to the upward-projecting arms of the first turner. When the parts are in the positions shown by full lines, the several springs 30 are in contact with the several downward projecting arms of the turners, so that further movement of the bar 28, in the direction of the arrow upon it, will cause said springs to impinge upon said arms and in so doing turn the turners upon their fulcrums. During this movement of the bar 28 the springs 30 continue to act upon the turners until they have been turned so far that the centers of gravity of the cans have been carried past the vertical planes of the centers of movement of the turners, whereupon the weight of the cans will continue the movement of the turners in the same direction. It will be seen that unless some means be employed to prevent it, the cans, thus acting upon the turners would give them a quick movement, and the cans would be permitted to fall with considerable force upon their support. It is to prevent this falling of the cans that the springs 34 are provided, said springs being so located with relation to the other parts that as soon as the center of gravity of each of the cans has been carried past the vertical plane of the center of motion of the turner by which it is engaged (the parts being shown in this position by Fig. 6) the arm of each turner which is succeeding the arm being acted upon by the spring 30 will come in contact with one of the springs 34, and in this way the movement of the turner under the influence of the weight of the cans, is controlled by the movement of the bar 28. After the turners have completed a quarter turn, and the can is again resting with one of its flat sides upon the supports, the movement of the bar 28 will be downward, so that by the time the said bar commences its movement in the direction opposite to that indicated by the arrow, the upper ends of all of the springs will be below the lower ends of all of the downward-projecting arms of the turners, and in this way the springs are made to clear the turners when moving in one direction, and engage them when moving in the other direction. After the bar 28 has continued in the direction of the arrow to a position a little beyond that shown in Fig. 2, the bar 5 will begin to move in the opposite direction, and when the bar 28 has completed its movement in the direction mentioned the bar 5 will have completed its movement, so as to bring all of the turners to the positions indicated by dotted lines. During the movement of the bar 28 in the direction opposite that indicated by the arrow, the bar 5 will move from the position indicated by dotted lines to the position shown by full lines, and in so doing the upward projecting arms of each turner will be brought into contact with the can which has just been left by the turner immediately behind it. If the distance moved by the bar 5 is greater than the distance between the upward projecting arms of the turner and the can, said arms will of course come in contact with the can before the bar completes its movement, and as a result of this the can will be carried backward, sliding upon the support. This sliding of the cans upon their support is advantageous, both while the cans are resting upon the support 3 of the solder pan, and while they are resting upon the support 38. While resting upon the support 3, the sliding of the cans will cause said support to perform the same function as does a soldering iron applied in the usual way, but in order to enable it to perform this function it must have a working surface so located that it can come against the end seam of the can. The sliding of the cans upon the support 38 will cause said support to act as a wiper. Another object in shifting the positions of the turners from that indicated by dotted lines to that shown by full lines, is to insure that the arms which are to engage the article in front and rear will both be in contact with it at the time the rotary movement of the turner commences. If they are not, if the article is some distance away from the upward projecting, or descending arm of the turner which is operating upon it, when the ascending arm (or the arm upon which the article rests and by which it is being lifted) reaches a sufficient inclination, the article will slip down it into the crotch, and strike against the descending arm, thus giving it a jar which is apt to disturb the solder and make the seam imperfect.

I desire to have it understood that the term turner as used in this specification, is intended to comprehend any form of device, however constructed, having a recess or crotch adapted to receive the article, and when moved, lift it from one place on the support and deposit it in another place. I prefer to construct this turner of a number of forks with narrow prongs, such as shown in Figs. 1, 2, 6 and 8, but, if desired, it may be constructed as shown in Fig. 9. Here it is formed of a disk or plate having four equidistant notches, the angle of whose sides corresponds with the angle of the body of the article.

I have described my improved mechanism for handling the cans only in connection with a solder bath, and with a support 38 upon which the cans rest after leaving the solder bath for a sufficient length of time to permit the solder to freeze, but it will of course be understood that the same mechanism is applicable to machines for the handling of all sorts of articles while they are being operated upon, where it is necessary to turn the articles over and over.

I desire to have it understood also that the present invention is not limited to any particular means for imparting movement to the turners, and that any means which will cause them to pick up the article from one place on its support and place it in another place on its support, is within the scope of the present invention.

The foregoing description is confined to a machine adapted to solder the seams at both ends of an article simultaneously, but, as above stated, the invention in its broadest aspect is not limited to a machine of this character.

A machine that is adapted to solder only one end of the article at a time is shown in Fig. 7. So far as the mechanism for handling the article is concerned, this machine does not differ from the one already described, and similar parts in both machines are indicated by similar figures of reference.

In the machine shown in Fig. 7, 50 is a solder pan, one edge, 51, of which serves as a support for one end of the article, a second support 52 being provided for the other end. These supports are located at different levels, so that when a can is resting upon them its corner will project down into the pan and into contact with the solder.

Having thus described my invention, the following is what I claim as new therein and desire to secure by Letters Patent:

1. In a machine of the character mentioned, the combination, with a support having a covering of soft material of means for turning the article over and over, and sliding it along the support, whereby the covering of the support is made to act as a wiper, substantially as set forth.

2. In a machine of the character mentioned, the combination with a support having a covering of soft material, of a reciprocable bar, means for imparting a reciprocating movement to said bar, and means carried by the bar and adapted to engage the article resting upon the support and slide it thereon, substantially as set forth.

3. In a machine of the character mentioned, a turner for turning the article over in a vertical plane, said turner having a plurality of forks for receiving the articles, a horizontal fulcrum about which said turner is adapted to rotate, and means for rotating it, in combination with a support for sustaining the article before and after it is turned, substantially as set forth.

4. In a machine of the character mentioned, the combination of a plurality of turners for turning the article over, said turners being located in series and at such distances apart that each (excepting the first) can engage the article where it is left by another, each of said turners being adapted to engage the article and being movable about a fulcrum, and means for moving them, substantially as set forth.

5. In a machine of the character mentioned, the combination of a plurality of turners for turning the article over, said turners being located in series and each having a fork movable about a fulcrum and adapted to receive the article between its prongs, and means for moving said forks about their fulcrums, said turners being so located that the prongs of one overlap the prongs of the other, substantially as set forth.

6. In a machine of the character mentioned, the combination of a plurality of turners for turning the article over, each having a fork movable about a fulcrum and adapted to receive the article between its prongs, said turners being arranged in series so that the article may pass from one to another, means for moving said forks about their fulcrums, and a support for sustaining the article as it passes from one of said turners to another, substantially as set forth.

7. In a machine of the character mentioned, the combination of a plurality of turners for turning the article over, a support for sustaining the article before and after it is acted upon by each of said turners, and means for changing the relative positions of the article and the turners, while the article is resting upon the supports, so as to bring the article in position to be taken up by each of said turners in succession, substantially as set forth.

8. In a machine of the character mentioned, the combination with a support of a turner for turning the article over, an endwise reciprocable bar upon which said turner is mounted, means for turning the said turner, and means for imparting an endwise reciprocating movement to the bar, substantially as set forth.

9. In a machine of the character mentioned, a turner for turning the article over, having in combination a plurality of forks, each adapted to receive the article between its prongs, a horizontal fulcrum about which all of said forks are movable, and means for moving them, substantially as set forth.

10. In a machine of the character mentioned, the combination with a support for the article, of a fork adapted to receive the article between its prongs, a fulcrum located at a level below the level of the upper surface of the support, and upon which said fork is adapted to move, the distance between the deepest part of the crotch of the fork and its center of motion, being less than the shortest distance between the center of movement of the fork and the top surface of the support, substantially as set forth.

11. In a machine of the character mentioned, a turner for turning the article over, having in combination a plurality of forks formed of a number of radial arms, a horizontal fulcrum upon which all of said forks are adapted to turn, and means for turning said forks, substantially as set forth.

12. In a machine of the character mentioned, the combination with a support for the article, of a turner for turning the article over, having a number of forks formed of a number of radial arms, each of said forks being adapted to receive the article between its prongs, a horizontal fulcrum upon which all of said forks are adapted to turn, means for turning said forks upon their fulcrums, and means for moving said forks forward and backward in the direction of the length of the support for the article, substantially as set forth.

13. In a machine of the character mentioned, the combination with a suitable support for sustaining the article, of a plurality of turners each adapted to partly turn the article over, each of said turners having a plurality of forks, formed of radial arms, horizontal fulcrums, about which said turners are movable and means for moving them, said turners being so arranged that each partially turns the article and deposits it upon the support in position to be taken up and turned by the next, substantially as set forth.

14. In a machine of the character mentioned, the combination of the plurality of turners, for turning the article over, each having a plurality of forks, formed of radial arms, fulcrums upon which said turners are adapted to turn, and means for turning them, said fulcrums being so located, that the arms of one of the said turners project beyond the arms of the next one of said turners, substantially as set forth.

15. In a machine of the character mentioned, the combination with a suitable support for the article, of a plurality of turners for turning the article over, each having forks formed of radial arms, fulcrums upon which the said turners are adapted to turn, means for turning said turners upon their fulcrums, and means for supporting said fulcrums and moving them forward and backward in the direction of the length of the support for the article, substantially as set forth.

16. In a machine of the character mentioned, the combination with a support for the article, of a plurality of turners for turning the article over, each having forks formed of radial arms, fulcrums upon which said turners are adapted to turn, a bar supporting said fulcrums and capable of reciprocating movement in the direction of the length of the support for the article, and means for moving said bar and for turning the forks upon their fulcrums, substantially as set forth.

17. In a machine of the character mentioned, the combination with a suitable support for the article, of a plurality of turners for turning the article over, and a bar extending parallel with the support and by which all of said turners are supported, said support and bar being movable relatively to each other, substantially as set forth.

18. In a machine of the character mentioned, the combination with a suitable support for the article, of a plurality of turners for turning the article over, each formed of a number of radial arms adapted to receive the article between them, fulcrums upon which said turners are adapted to turn, and means engaging one of the arms of each turner and thereby turning said turner upon its fulcrum, substantially as set forth.

19. In a machine of the character mentioned, the combination with a suitable support for the article, of a plurality of turners for turning the article over, each formed of a number of radial arms, a fulcrum upon which each of said turners is adapted to turn, a number of springs each adapted to engage one of the arms of each of said turners, and means for imparting a to-and-fro movement to each of the said springs whereby the said turners are turned, substantially as set forth.

20. In a machine of the character mentioned, the combination with a suitable support for the article, of a plurality of turners for turning the article over, each made up of a number of radial arms, fulcrums upon which said turners are adapted to turn, a number of springs each adapted to engage one of the arms of each of said turners, a second set of springs, each adapted to engage the succeeding arm of one of said turners, and means for moving said springs in a circular path, substantially as set forth.

21. In a machine of the character mentioned, the combination with a suitable support for the article, of a plurality of turners for turning the article over, each made up of a number of radial arms, fulcrums upon which turners are adapted to turn, a bar, means for moving said bar in a circular direction and at the same time maintaining its parallelism, and springs carried by the bar and adapted to engage and move the said turners, substantially as set forth.

22. In a machine of the character mentioned, the combination with a suitable support for the articles, of a plurality of turners for turning the article over, each made up of a number of radial arms, an endwise reciprocable bar upon which said turners are fulcrumed, means for reciprocating said bar, and means moving in the direction opposite that in which the bar aforesaid is for the time being moving, and adapted to engage the radial arms aforesaid and turn them, substantially as set forth.

23. In a machine of the character mentioned, the combination with a suitable support for the articles, of the endwise reciprocating bars 5 and 28, means for moving said bars in opposite directions, a plurality of turners for turning the article over, fulcrumed to the bar 5, and means carried by the bar 28 and adapted to engage said turners and turn them, substantially as set forth.

24. In a machine of the character mentioned, the combination with suitable supports for the articles, of the endwise reciprocating bar 5, the bar 28, cranks supporting the bar 28 and confining it to movement in a circular path, means for moving the bars 5 and 28 in opposite directions, a plurality of turners for turning the article over, fulcrumed to the bar 5, and means carried by the bar 28 and adapted to engage and turn said turners, substantially as set forth.

25. In a machine of the character mentioned, the combination with a suitable support for the articles, of the endwise reciprocating bar 5, the bar 28, cranks by which said bar 28 is supported and confined to a movement in a circular direction, means for moving said bars in opposite directions, a plurality of turners for turning the article over, fulcrumed to the bar 5, each of said turners being made up of a number of radial arms, and springs carried by the bar 28 and each adapted to engage one arm of each turner aforesaid, for turning it until the center of gravity of the article has passed the center of motion of the turner aforesaid and adapted to also engage the succeeding arm and control the further movement of the turners, substantially as set forth.

CHARLES M. BROWN.

Witnesses:
L. M. HOPKINS,
A. H. COOPER.